United States Patent [19]

Levecque et al.

[11] 4,070,173

[45] Jan. 24, 1978

[54] METHOD AND APPARATUS FOR FIBERIZING ATTENUABLE MATERIALS

[75] Inventors: Marcel Levecque, Birchrunville, Pa.; Jean A. Battigelli; Dominique Plantard, both of Rantigny, France

[73] Assignee: Saint-Gobain Industries, Neuilly-sur-Seine, France

[21] Appl. No.: 780,589

[22] Filed: Mar. 24, 1977

Related U.S. Application Data

[63] Continuation-in-part of Ser. No. 762,789, Jan. 25, 1977, which is a continuation-in-part of Ser. No. 676,755, April 14, 1976, which is a continuation-in-part of Ser. No. 557,282, March 11, 1975, Pat. No. 4,015,964, which is a continuation-in-part of Ser. No. 353,984, April 24, 1973, Pat. No. 3,885,940.

[30] Foreign Application Priority Data

| Feb. 9, 1976 | France | 76 03416 |
| Feb. 18, 1975 | France | 75.04970 |
| Mar. 30, 1973 | France | 73 11525 |
| Dec. 16, 1976 | France | 76 37884 |

[51] Int. Cl.² .............................................. C03B 37/06
[52] U.S. Cl. .............................................. 65/5; 65/16; 264/5; 264/12; 425/7
[58] Field of Search ................. 65/5, 16, 6, 7, 8, 14, 65/15; 264/5, 12, 176 F; 425/7

[56] References Cited

U.S. PATENT DOCUMENTS

| 2,126,411 | 8/1938 | Powell | 65/5 |
| 3,357,808 | 12/1967 | Eberle | 65/16 X |
| 3,874,886 | 4/1975 | Levecque et al. | 65/5 |
| 3,885,940 | 5/1975 | Levecque et al. | 65/5 |

FOREIGN PATENT DOCUMENTS

| 873,006 | 3/1942 | France | 65/6 |
| 167,228 | 5/1959 | Sweden | 65/5 |

Primary Examiner—Robert L. Lindsay, Jr.
Attorney, Agent, or Firm—John T. Synnestvedt

[57] ABSTRACT

Method and apparatus are disclosed for converting a stream of attenuable material into a fiber by employment of a gaseous jet penetrating a gaseous blast, thereby producing a zone of interaction in which the stream is attenuated to form a single long fiber. The gaseous jet may have lower velocity than the blast but may have lower temperature than the blast, thereby providing a jet of higher kinetic energy than the blast so that the jet will penetrate the blast. It is also contemplated that the glass stream may be initially delivered to the jet to be carried thereby into the zone of interaction with the blast, thereby providing for preliminary attenuation in the jet before the stream reaches the blast.

7 Claims, 3 Drawing Figures

METHOD AND APPARATUS FOR FIBERIZING ATTENUABLE MATERIALS

CROSS REFERENCES

The present application is a Continuation-in-part of our applications Ser. No. 762,789, filed Jan. 25, 1977, which application is in turn a continuation-in-part of application Ser. No. 676,755, filed Apr. 14, 1976, which in turn is a continuation-of-part of application Ser. No. 557,282 filed Mar. 11, 1975, now U.S. Pat. No. 4,015,964 granted April 5, 1977 which, in turn, is a Continuation-in-part of our application Ser. No. 353,984 filed Apr. 24, 1973 and issued May 27, 1975 as U.S. Pat. No. 3,885,940. The subject matter of said patent is also disclosed in the related Levecque and Battigelli U.S. Pat. No. 3,874,886.

BACKGROUND

The invention relates to the production of fine fibers from attenuable materials, particularly thermoplastic materials or materials which soften upon entering a molten state as a result of the application of heat and which harden or become relatively solid upon cooling.

The method and equipment of the invention are especially suited to the formation of fibers from mineral materials such as glass and the disclosure herein accordingly describes the invention as applied to the production of glass fibers from molten glass.

Many techniques are already known for production of fibers from molten glass, some of the techniques most widely used heretofore being identified and briefly described just below.

1. Longitudinal Blowing: Other terms sometimes used include "blown fiber", "steam blown wool", "steam blown bonded mat", "low pressure air blowing", or "lengthwise jets".
2. Strand: Other terms sometimes used are "continuous filament", or "textile fibers".
3. Aerocor: Another term sometimes used is "flame attenuation".
4. Centrifuging: Other terms sometimes used include "rotary process", "centrifugal process", "tel process", or "supertel process".

There are numerous variants of each of the above four processes, and some efforts in the art to combine certain of the processes. Further, there are other techniques discussed in the prior art by which prior workers have attempted to make glass fibers. However, the variants, attempted combinations, and attempted other techniques, for the most part have not met with sufficient success to achieve a separate and recognizable status in the art.

The four techniques above referred to may briefly be described as follows.

1. Longitudinal Blowing

Longitudinal blowing (examples of which are referred to as items 1, 2, 3 and 4 in the bibliography herebelow) is a glass fiber manufacturing process according to which melted glass flows from the forehearth of a furnace through orifices in one or two rows of tips protruding downwardly from a bushing, the glass being thereby formed into multiple glass streams which flow down into an attenuating zone where the streams pass between downwardly converging gaseous blasts. The blast emitting means are located in close proximity to the streams so that the converging blasts travel in a downward direction substantially parallel to the direction of travel of the glass streams. Generally the glass streams bisect the angle between the converging blasts. The blasts are typically high pressure steam.

There are two longitudinal blowing techniques. In the first technique the attenuating blasts engage already drawn fibers and the product resulting is typically a mat, commonly known as "steam blown bonded mat", suitable for reinforcement. In the second longitudinal blowing technique the attenuating blasts strike directly on larger streams of molten glass and the product resulting is typically an insulation wool commonly known as "steam blown wool".

In a variation (see item 5) of the first longitudinal blowing technique, the entire bushing structure and associated furnace are enclosed within a pressure chamber so that, as the streams of glass emerge from the bushing, the streams are attenuated by pressurized air emerging from the pressure chamber through a slot positioned directly beneath the glass emitting tips of the bushing, this variation being commonly referred to as "low pressure air blowing", and products being commonly known as "low pressure air blown bonded mat and staple yarn".

2. Strand

The strand glass fiber manufacturing process (see items 6 and 7) begins in the manner described above in connection with longitudinal blowing, that is, multiple glass streams are formed by flow through orifices in tips protruding downwardly from a bushing. However, the strand process does not make use of any blast for attenuation purposes but, on the contrary, uses mechanical pulling which is accomplished at high speed by means of a rotating drum onto which the fiber is wound or by means of rotating rollers between which the fiber passes. The prior art in the field of the strand process is extensive but is of no real significance to the present invention. Strandtechniques therefore need not be further considered herein.

3. Aerocor

In the aerocor process (see items 8 and 9) for making glass fibers, the glass is fed into a high temperature and high velocity blast while in the form of a solid rod, rather than flowing in a liquid stream as in the longitudinal blowing and strand processes discussed above. The rod, or sometimes a coarse filament, of glass is fed from a side, usually substantially perpendicularly, into a hot gaseous blast. The end of the rod is heated and softened by the blast so that fiber can be attenuated therefrom by the force of the blast, the fiber being carried away entrained in the blast.

4. Centrifuging

In the centrifuging glass fiber manufacturing process (see items 10 and 11) molten glass is fed into the interior of a rapidly rotating centrifuge which has a plurality of orifices in the periphery. The glass flows through the orifices in the form of streams under the action of centrifugal force and the glass streams then come under the influence of a concentric and generally downwardly directed hot blast of flames or hot gas, and may also, at a location concentric with the first blast and farther outboard from the centrifuge, come under the action of another high speed downward blast, which latter is generally high pressure air or steam. The glass streams are thereby attenuated into fine fibers which are cooled and discharged downwardly in the form of glass wool.

In addition to the four categories of fiber forming techniques which have been very generally referred to and distinquished above, various refinements and variations of those techniques have also been known and repeated efforts have been made to optimize the manufacture of glass fibers by one or more of the processes which start with molten streams of glass. Various of these prior art techniques have been concerned with trying to optimize the attenuation process by extending or lengthening the attenuation zone, either by providing special means to accomplish the addition of heat to the streams of glass and to the embryonic fibers (see item 12), or through the use of confining jets (see items 13 and 14), or both (see item 15).

The approach taken in the just mentioned prior art technique suggests that the realization of optimum fiberization lies in extending the length of a single attenuating zone.

In contrast, in the preferred practice of the present invention, attenuation is accomplished by subjecting a glass stream to two sequential stages of attenuation, performed under different conditions, as will further appear.

Various other approaches have been suggested for introducing glass in the molten state into an attenuating blast (see items 16, 17, 18 and 19). In such attempts to introduce a stream of molten glass into an attenuating blast it has been noted that there often is a tendency for the glass stream to veer to a path of travel on the periphery of the blast, that is, to "ride" the blast, rather than penetrating into the core region of the blast where attenuating conditions are more effective. Suggestions have been made to deal with this "riding" problem, including the use of physical baffles as in Fletcher (item 16), and the transfer of substantial kinetic energy to the glass stream as, for example, by the modifications of the centrifuging process taught in Levecque (item 11), Paymal (item 18), and Battigelli (item 19).

An alternate approach to the problem, more closely akin to the aerocor process, has been the introduction of the glass in the form of a solid (item 9) or pre-softened (item 20) glass rod or in the form of powdered glass (item 14).

BIBLIOGRAPHY OF PRIOR PATENTS

1. Slayter et al. U.S. Pat. No. 2,133,236
2. Slayter et al. U.S. Pat. No. 2,206,058
3. Slayter et al. U.S. Pat. No. 2,257,767
4. Slayter et al. U.S. Pat. No. 2,810,157
5. Dockerty U.S. Pat. No. 2,286,903
6. Slayter et al. U.S. Pat. No. 2,729,027
7. Day et al. U.S. Pat. No. 3,269,820
8. Stalego U.S. Pat. No. 2,489,243
9. Stalego U.S. Pat. No. 2,754,541
10. Levecque et al. U.S. Pat. No. 2,991,507
11. Levecque et al. U.S. Pat. No. 3,215,514
12. Stalego U.S. Pat. No. 2,687,551
13. Stalego U.S. Pat. No. 2,699,631
14. Karlovitz et al. U.S. Pat. No. 2,925,620
15. Karlovitz U.S. Pat. No. 2,982,991
16. Fletcher U.S. Pat. No. 2,717,416
17. Eberle U.S. Pat. No. 3,357,808
18. Paymal U.S. Pat. No. 3,634,055
19. Battigelli U.S. Pat. No. 3,649,232
20. Stalego U.S. Pat. No. 2,607,075

GENERAL STATEMENT OF THE INVENTION AND OBJECTS

In contrast with all of the foregoing prior art techniques, it is a major objective of the present invention to provide certain improvements in the production of fibers from streams of molten glass or similar attenuable materials. The technique of the present invention in part utilizes the fiber toration techniques or principles disclosed in our prior applications above identified Ser. No. 762,789, Ser. No. 676,755, U.S. Pat. No. 4,015,964 and U.S. Pat. No. 3,885,940. Thus, the technique of the present invention makes use of the attenuating capability of a zone of interaction developed by the direction of a secondary jet of relatively small cross section transversely into a principle blast or jet of relatively large cross section. However, according to one aspect of the preferred practice of the present invention, instead of directly admitting or delivering a stream of molten glass to the zone of interaction, the glass stream is delivered from an appropriate orifice spaced an appreciable distance above the zone of interaction.

Moreover, in a typical technique according to the preferred practice of the present invention, the blast is discharged in a generally horizontal direction, the glass admission orifices are arranged in spaced relation above the blast, and at an intermediate elevation, secondary jets are directed downwardly toward the blast, the jet orifices being positioned adjacent to the decending glass streams, and preferably inclined somewhat with respect to the vertical, so that the glass streams enter the influence of the jets at a point above the upper boundary of the blast, but well below the glass orifices. Preferably also each secondary jet orifice and the associated glass stream are spaced from each other in a direction upstream and downstream of the direction of flow of the blast, with the jet orifice located, with respect to the direction of flow of the blast, on the upstream side of the glass stream.

The system of the invention, as just briefly described, functions in the following manner:

Each secondary jet, being spaced appreciably above the upper boundary of the blast, causes induction of the ambient air so that the jet develops a sheath or envelope of induced air which progressively increases in diameter as the upper boundary of the blast is approached. The jet thus is comprised of two portions, i.e. the core itself which is initially delivered from the jet orifice and the main body of the jet which is frequently referred to as the mixing zone, i.e. the zone represented by the mixture of the gas of the core with induced air.

In a typical embodiment, the jet core extends for a distance beyond the jet orifice equal to from three to 10 times the diameter of the jet orifice, depending primarily upon the velocity of the jet through the orifice. Since in installations of the kind here involved, the jet orifices are of only very small diameter, the extent to which the jet core is projected beyond the orifice is relatively short. The jet core is conical and the mixing zone surrounds the jet core from the region of delivery from the jet orifice and is of progressively increasing diameter downstream of the jet, including a length of travel extended well beyond the tip of the jet core cone. In such a typical installation, the spacing between the jet orifice and the boundary of the blast is such that the point of intersection of the blast lies beyond the tip of the core, although with certain proportions the jet core may come close to or somewhat penetrate the blast. In any event, it is contemplated that at the point of intersection of the jet and blast, the body of the jet or jet stream retains sufficient kinetic energy to penetrate the blast and thereby develop a zone of interaction between the jet and the blast. This zone of interaction has the same general characteristics as the zone of interaction referred to and fully described in our prior applications Ser. No. 762,789, U.S. Pat. Nos. 4,015,964 and 3,885,940 above identified.

With the foregoing in mind, attention is now directed to the glass stream and its behavior in relation to the jet and blast. As already noted, the glass stream is delivered from an orifice spaced above the blast and also spaced appreciably above the point of delivery or discharge of the secondary jet. Preferably the glass discharge orifice is so located as to deliver a stream of glass which by free-fall under the action of gravity will follow a path which would intersect the jet flow at a point appreciably above the upper boundary of the blast and thus also above the zone of interaction. As the glass stream approaches the jet, it is influenced by the currents of induced air and is thereby caused to deflect toward the jet above the point where the glass stream would otherwise have intersected the axis of the jet flow. The induction effect causes the stream of glass to approach the jet and, depending upon the position of the glass orifice, the induction effect will either cause the glass stream to enter the envelope of induced air surrounding the core, or will cause the glass stream to enter the main body of the jet at a point downstream of the jet core. In either case, the glass stream will follow a path leading into the mixing zone and the glass stream will travel within the body of the jet downwardly to the zone of interaction with the blast.

Thus, the glass stream is carried by the induced air currents into the mixing zone of the jet, but does not penetrate the jet core. The glass stream may be carried by the induced air even to the surface of the jet core, but still will not penetrate the core, which is desirable in order to avoid fragmentation of the glass stream. Since the glass stream is at this time in the influence of the mixing zone of the jet, the stream of glass will be subjected to a preliminary attenuating action and its velocity will increase as the upper boundary of the blast is approached.

In addition to this attenuating action, which is aerodynamic in character, the attenuating stream is subjected to certain other dynamic forces tending to augment the attenuation. This latter attenuation action is caused by the tendency for the attenuated stream to move toward the center of the jet and then be reflected toward the boundary of the jet into the influence of the air being induced. The attenuating stream is then again caused to enter into the interior of the jet. This repeated impulsion supplements the aerodynamic attenuating action.

In the region of interaction with the blast, the partially attenuated stream of glass will be caused to enter the zone of interaction, in part because of the acceleration of the glass resulting from the action of gravity and from the preliminary attenuation described just above, and in part under the influence of the currents established in the zone of interaction itself, in the manner fully explained in our prior application Ser. No. 762,789, U.S. Pat. No. 4,015,964 and 3,885,940, above identified.

Thus it will be seen, that according to the invention, the glass stream is subjected to two successive stages of attenuation. It is also to be observed that since the glass stream is caused to come under the influence of the jet by virtue of the induced currents surrounding the jet, the preliminary attenuation is accomplished without fragmenting the glass stream. Moreover the succeeding or second stage of attenuation which is effected in the zone of interaction between the jet and the blast is also accomplished without fragmenting the fiber being formed. By this two stage attenuating technique it is thus possible to produce long fibers.

This multi-stage attenuation technique of the present invention has important advantages as compared with various prior techniques. Thus, it provides a technique for the production of long fibers while at the same time making possible greater separation between certain components of the equipment, notably the blast generator or burner, with its nozzle or lips, the jet nozzle and the gas or air supply means associated therewith and the glass supply means including the bushing or similar equipment having glass orifices. This separation of components is not only of advantage from the standpoint of facilitating the structural installation, but is further of advantage because the separation makes possible more convenient and accurate regulation of operating conditions, notably temperature of the blast, jets and glass supply means. Still another advantage of the arrangement according to the present invention, is that the spacing of the glass supply means with its orifices for discharging streams of glass makes possible the utilization of larger glass orifices (which is sometimes desirable for special purposes or materials) because, in the distance of free-fall provided for the glass streams, such streams decrease in diameter under the influence of the gravitational acceleration. The streams should of course be of relatively small diameter at the time of initiation of attenuation, and the desired small diameter can readily be achieved, because of the distance of free-fall, notwithstanding the employment of delivery orifices of relatively large size.

The foregoing has still another advantageous feature, namely the fact that a higher temperature may be utilized in the glass bushing or other supply means, thereby enabling use of attenuable materials at higher temperatures, because during the distance of free-fall of the glass stream, the stream is somewhat cooled because of contact with the surrounding air, thereby bringing the stream down to an appropriate temperature for the initiation of attenuation.

Because of various of the foregoing factors, the system of the present invention facilitates the use of certain types of molten materials in the making of fibers, for instance slag or certain special glass formulations which do not readily maintain uniformity of flow through discharge orifices of small size. However, since both larger diameter discharge orifices and higher temperatures may be used in the supply of the molten material, it becomes feasible to establish uniformity of feed and attenuation even with certain classes of attenuable materials which could not otherwise be employed in a technique based upon production of fibers by attenuation of a stream of molten material.

It is also noted that various of the four principle prior art techniques referred to above are subject to a number of limitations and disadvantages. For example, various of the prior techniques are limited from the standpoint of production capacity or "orifice pull rate", i.e. the amount of production accomplished within a given time by a single fiber producing center. In other cases, the fiber product contains undesirable quantities of unfiberized material. Strand type of operations, while effective for producing strand material, are not best suited for production of insulation type of fiber blanket and other similar types of products. Centrifuging, while effective for producing fiber insulation blanket has the disadvantage that the centrifuge must rotate at high speed, thus necessitating special working parts and maintenance, and further because the centrifuge is required to be formed of special alloys capable of withstanding the high temperatures.

Another general objective of the present invention is to provide a technique which overcomes various of the foregoing disadvantages or limitations of the prior art techniques referred to.

Moreover, the technique of the present invention provides for high production rates and utilizes only static equipment.

In accordance with another aspect of the present invention it is contemplated that certain novel temperature and velocity relationships of the blast and the jet be employed, providing additional advantages as compared with the techniques of our prior application hereinabove referred to, regardless of whether the stream of molten glass is delivered directly into the zone of interaction of the jet and the blast, or is delivered initially into the influence of the jet to be carried thereby into the zone of interaction with the blast. These novel relationships will be fully developed and explained hereinafter, following the description of the embodiment of the invention illustrated in the accompanying drawings.

DETAILED DESCRIPTION OF THE INVENTION

Figure 1:
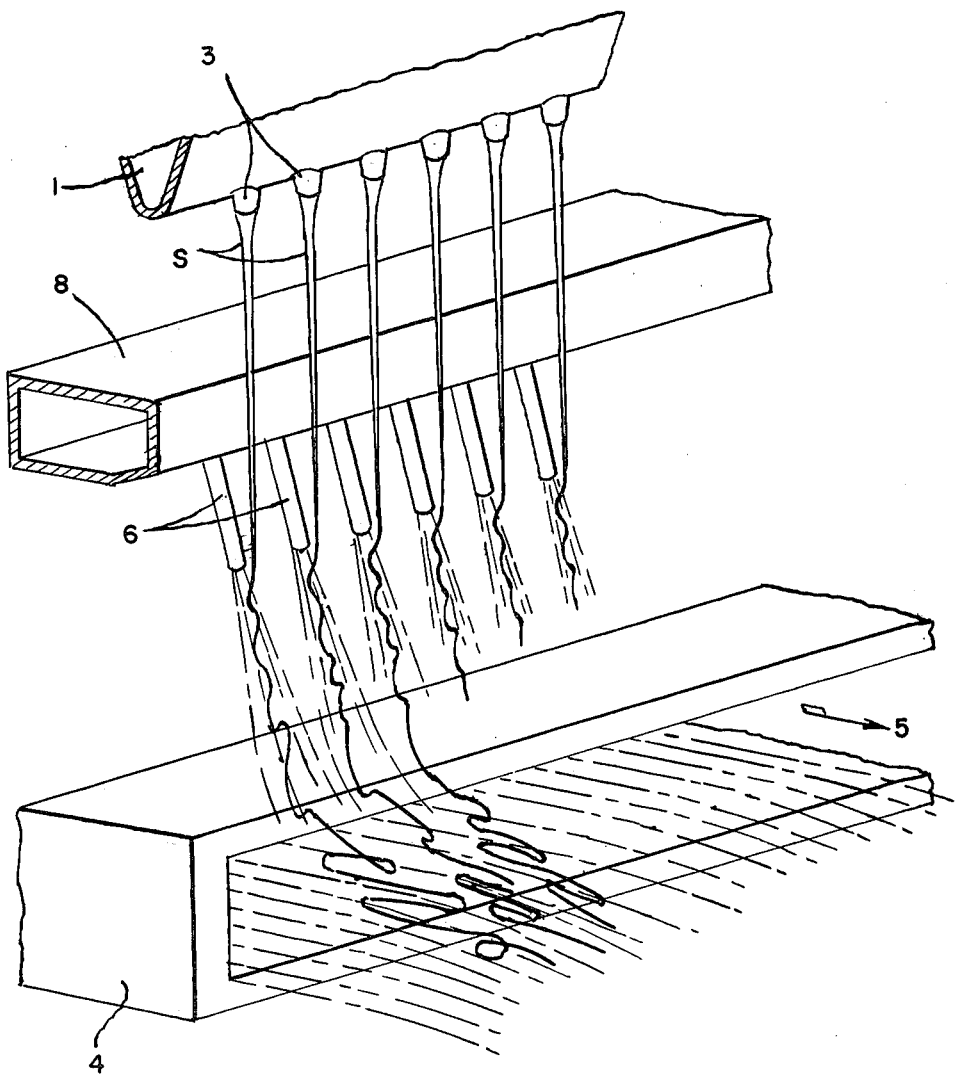
Figure 2:
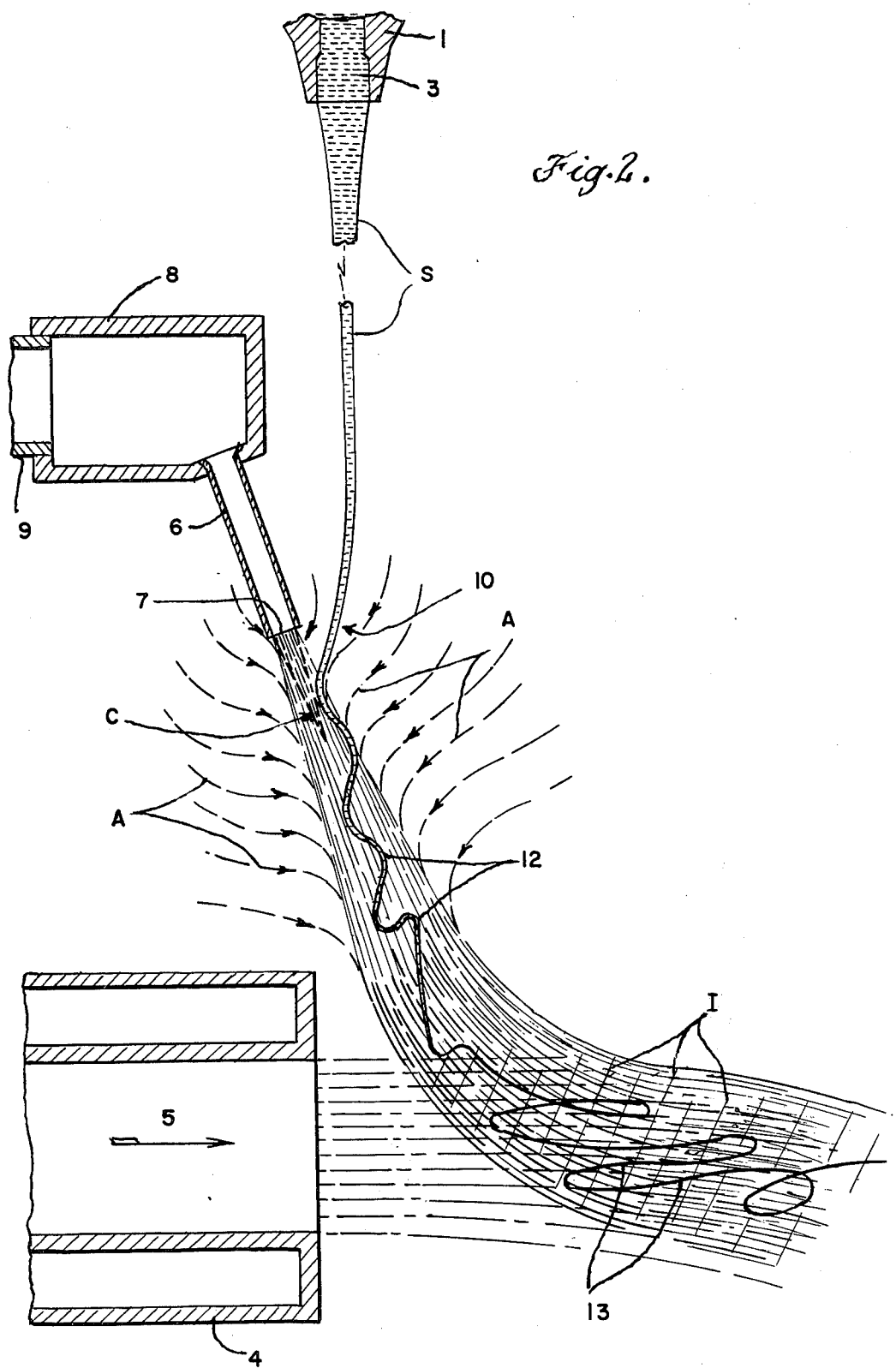
Figure 3:
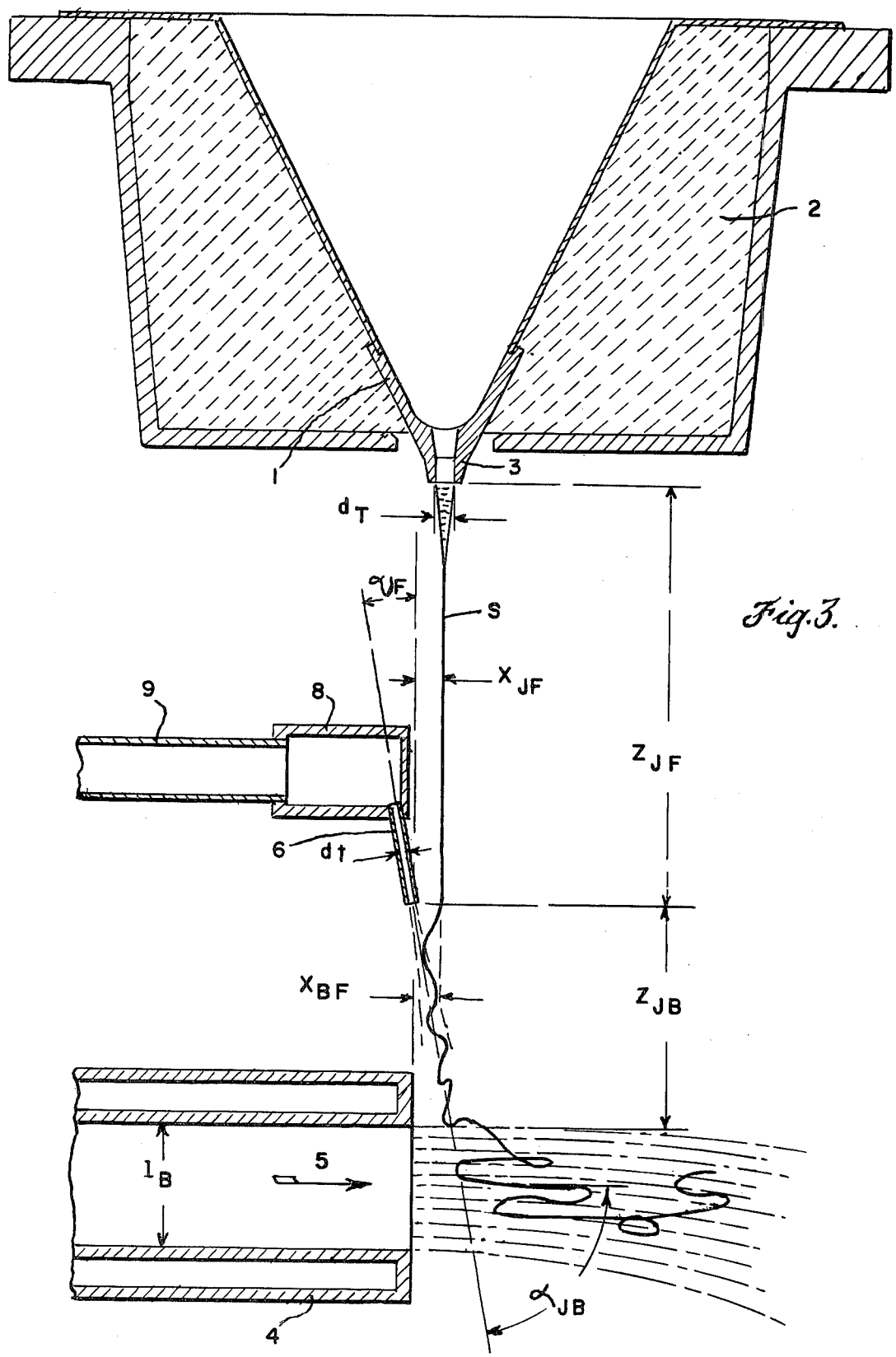

The accompanying drawings illustrate, on an enlarged scale, a preferred embodiment of the present invention, and in these drawings FIG. 1 is a fragmentary isometric view showing equipment including means for developing a blast, means for developing a series of secondary jets above the blast and directed downwardly toward the blast, together with means for establishing glass streams delivered by gravity from a region above the jets downwardly into the zone of influence of the jets and ultimately into the influence of the zone of interaction with the blast;

FIG. 2 is a vertical sectional view through equipment for establishing a single fiberizing station as arranged according to the present invention; and FIG. 3 is a view similar to FIG. 2 but more diagrammatic and further illustrating certain dimensional relationships to be taken into account in establishing operating conditions in accordance with the preferred practice of the present invention.

In the drawings, the glass supply means includes a crucible or bushing 1 which may be supplied with molten glass in any of a variety of ways, for instance by means of the forehearth indicated at 2 in FIG. 3. Glass supply orifices 3 deliver streams of molten glass downwardly under the action of gravity as indicated at S.

A gaseous blast is discharged in a generally horizontal direction from the discharge nozzle 4, the blast being indicated by the arrow 5. The blast may originate in a generator, usually comprising a burner, so that the blast consists of the products of combustion, with or without supplemental air.

As will be seen from the drawings, the blast is directed generally horizontally below the orifices 3 from which the glass streams S are discharged.

At an elevation intermediate the crucible and the blast discharge device 4, jet tubes 6 are provided, each having a discharge orifice 7, the jet tubes receiving gas from the manifold 8 which in turn may be supplied through the connection fragmentarily indicated at 9.

As is disclosed in various of our prior applications above identified, the gases for delivery to and through the jet tubes 6 may originate in a gas generator taking the form of a burner and the products of combustion may serve for the jet, either with or without supplemental air. Preferably such combustion gases are diluted with air so as to avoid excessively high temperature of the gas delivered through the jet tubes. On the other hand, in the preferred practice of the present invention and as will be explained more fully hereinafter, the gas employed for the jet may comprise air at temperatures well below those of gases derived from a burner.

Each jet tube 6 and its orifice 7 is arranged to discharge a gaseous jet downwardly at a point closely adjacent to the feed path of one of the glass streams S and preferably at the side of the stream S which, with respect to the direction of flow of the blast 5, is upstream of the glass stream. Moreover, each jet tube 6 and its orifice 7 is arranged to discharge the jet in a path directed downwardly toward the blast and which is inclined to the vertical and so that the projection of the paths of the glass stream and the jet intersect at a point spaced above the upper boundary of the blast 5.

It is contemplated that the vertical dimension of the blast and also the width thereof be considerably greater than the cross sectional dimensions of each secondary jet, so that adequate volume of the blast will be available for each jet to develop a zone of interaction with the blast. For this purpose also, it is further contemplated that the kinetic energy of the jet in relation to that of the blast, in the operational zone of the jet and blast, should be sufficiently high so that the jet will penetrate the blast. As pointed out in our applications above referred to, this requires that the kinetic energy be substantially higher than that of the blast, per unit of volume. Still further, the jet preferably has a velocity considerably in excess of the velocity of the glass stream as fed under the action of gravity downwardly toward the point of contact with the jet and sometimes also in excess of the velocity of the blast, depending upon the temperatures of the jet and blast, as will be explained more fully hereinafter.

The operation of each fiberizing center is as follows:

From the drawings and especially from FIG. 2, it will be seen that the core C of the jet causes the induction of currents of air indicated by the lines A, the amount of air so induced progressively increased along the path of the jet. When the body of the jet, i.e. the gas of the core intermixed with the induced air, reaches the boundary of the blast, a zone of interaction is established in the region indicated by cross-lining marked I in FIG. 2.

As the stream S of molten glass descends and approaches the jet delivered from the orifice 7, the currents of air induced by the action of the jet cause the stream of glass to deflect toward the jet core as indicated at 10. Although the glass orifice 3 may be of substantially larger diameter or cross section than the jet orifice 7, the gravity feed of the glass stream S results in substantial reduction in diameter of the glass stream, so that when the stream meets the jet, the diameter of the stream is much smaller than the diameter of the glass orifice. With the higher velocity of the jet, as compared with that of glass stream, even when the glass stream meets the jet in the upstream region adjacent the jet core, the glass stream will not penetrate the jet core. However, because of the induced air currents surrounding the jet, the glass stream is caused to "ride" on the surface of the jet core within the surrounding sheath of induced air or to enter the body of the jet downstream of the jet core.

The action of the induced air in bringing the glass stream to the jet stabilizes the feed of the glass stream and will also assist in compensating for minor misalignment of the glass orifice with respect to the jet orifice. Because of the reliance upon induction effects of an isolated jet, the glass stream is brought into the mixing zone of the gas originating in the jet core and the induced air without subdivision or breakage of the stream or the fiber being formed. This action is enhanced by virtue of the fact that in the arrangement as above described and illustrated, the glass stream is not subjected to any sharp angled change in its path of movement before it has been subjected to some appreciable attenuation, thereby reducing its diameter and inertia.

In consequence of the glass stream being carried in the mixing zone of the jet, the glass stream is partially attenuated, this action representing the first stage of the two-stage attenuation above referred to. In turn, in consequence of this partial attenuation, the length of the embryonic fiber is increased, and this increase in length is accommodated by an undulating or whipping action, thereby forming loops, as indicated at 12. It is to be noted, however, that the glass stream remains intact, the loops of the embryonic fiber being carried downwardly in the mixing zone.

At the point where the blast 5 intercepts the jet, the jet penetrates the blast. This penetration of the blast by the jet establishes currents in the zone of interaction of the jet with the blast, which currents carry the partially attenuated glass stream into the interior of the blast and in consequence a second stage of attenuation occurs. This results in further increase in the length of the fiber being formed. The increase in fiber length is accommodated by additional undulating or whipping action, forming further enlarged loops as indicated at 13 within the blast. Notwithstanding this action, a typical fiber will remain intact and will be carried away by the blast flow in the form of a fiber of considerable length. Thus a single stream of molten glass is converted into a single glass fiber by a two-stage attenuation operation. It will be understood that in effecting this two-stage attenuation, the temperature of the glass and the temperature of the jet, as well as the temperature of the blast, are established at values which will retain the glass in attenuable condition throughout the first stage of attenuation and throughout the second stage until the attenuation has been completed in the zone of interaction between the jet and the blast.

In connection with the arrangement of the invention, it is to be understood that fiberizing centers may be arranged in multiple, as illustrated in FIG. 1. This is accomplished by employing a blast 5 which is broad or of large dimension in the direction perpendicular to the plane of FIG. 2, and by employing a similarly extended crucible 1 having a multiplicity of glass orifices, and further by employing a multiplicity of jet tubes 6 each having an orifice adjacent to one of the streams S of glass being delivered from the several glass orifices, all as shown in FIG. 1. Such a multiplicity of jet tubes may be supplied with the jet gas from a common manifold 8.

As hereinabove indicated, the present invention contemplates employment of certain combinations of lower jet velocities and temperatures than used in the arrangements described in our earlier applications Ser. Nos. 557,282 and 353,984 (U.S. Pat. No. 3,885,940), in which prior applications the stream of glass is delivered directly into the zone of interaction between the jet and blast. Such lower jet velocities and temperatures are also referred to in our prior applications Ser. Nos. 676,755 and 762,789, in which the stream of glass is delivered first into the influence of the jet, to be carried thereby into the zone of interaction with the blast.

Such use of lower jet velocities and temperatures is thus applicable not only to toration techniques in which the glass stream is initially delivered into the influence of the jet, to be carried thereby into the zone of interaction with the blast, but is also applicable to toration techniques in which the stream of glass is initially delivered into the zone of interaction of the jet with the blast.

Certain operating characteristics and advantages are to be noted in connection with the employment of lower jet velocities and temperatures and these are explained hereinbelow.

It is first to be noted that in any of the toration techniques referred to above it is contemplated that the jet have kinetic energy per unit of volume higher than that of the blast in the operational area of the jet and blast, this being a requirement for penetration of the jet into the blast. This is necessary in order to develop the toration zone, i.e., the zone of interaction characterized by high velocity currents under the influence of which the attenuation of the glass stream takes place as is fully explained in prior applications referred to and especially in U.S. Pat. No. 3,885,940. With both the jet and the blast supplied with operating fluid from burners, the jet and the blast would normally both have temperatures above at least several hundred degrees centigrade. For example Table III in the above mentioned patent, refers to jet and blast temperatures of 800° and 1580° C, respectively. In contrast to the above, and by way of example, it is contemplated according to the present invention that the jet temperature may approximate ambient or room temperature. Furthermore, certain of the prior toration techniques utilized a jet having a velocity usually higher than the velocity of the blast. Thus, Table III of the prior patent referred to indicates a jet velocity of 580 m/sec, and a blast velocity in the range of from 224 to 283 m/sec.

According to the present invention it is contemplated to use a jet velocity considerably lower than that referred to just above and even lower than the blast velocity. The lower temperature and velocity contemplated by the present invention still provides the required kinetic energy ratio between the jet and blast, i.e., a jet having kinetic energy higher than that of the blast so that the jet will penetrate the blast and create a zone of interaction. The reason why this desired kinetic energy ratio is still present with the lower velocity of the jet is because of the higher density of the jet fluid at the lower temperature. The density, of course, increases with decrease of temperature and since the kinetic energy is determined not by the velocity alone but also by the density of the jet fluid, a jet may readily be provided having a higher kinetic energy per unit of volume than the blast, even at velocities lower than the velocity of the blast.

By employing the lower jet temperatures (for instance a temperature approximating ambient or room temperature) a number of advantages are attained. In the first place when utilizing such temperature for the jet, it is feasible to employ a commonly available source of compressed air as the source of fluid for the jet. The lower temperature also makes it practical to use commonly available materials, such as stainless steel for the jet generating device, rather than more sophisticated and expensive materials, such as platinum alloys or ceramics, which are needed where very high temperature jets are used.

The lower temperatures for the jet also reduce oxidation problems, and further reduce or avoid certain thermal warpage problems, and in addition the maintenance of more uniform temperature from jet to jet in a multiple center fiberizing installation is more readily achieved.

Still further, the arrangement of the lower temperatures for the jet facilitates introducing the fiber being formed into a relatively cool environment as soon as the fiber is attenuated, this consideration being of importance in the toration technique, for reasons which are fully brought out in our prior patent above referred to.

The capability of utilizing commonly available sources of compressed air, which is made possible by virtue of employing lower jet temperatures, also has a distinct advantage in that the air is much less expensive than high temperature fluids, for example products of combustion or steam.

It is also to be kept in mind that by employing a jet fluid at a temperature approximating ambient or room temperature, consumption of energy to heat the jet is eliminated.

The foregoing advantages are achieved regardless of whether the toration technique is one in which the stream of glass is initially delivered directly into the zone of interaction or whether the stream of glass is initially delivered into the influence of the jet, to be carried thereby into the zone of interaction, and in the latter case, the advantages are attained whether or not the jet is deflected from its initial path, as in our copending application Ser. No. 762,789. Where a jet deflector is used the low temperature jet is of special advantage because it assists in maintaining dimensional accuracy of the deflector in relation to the jet generator including the jet orifice.

In addition to the foregoing, in the two-stage attenuation technique disclosed herein, as well as in the arrangements of our copending applications Ser. Nos. 676,755 and 762,789, in which the stream of attenuable material is initially delivered to the jet, the lower jet velocities and temperatures may assist in avoiding fragmentation of the stream of attenuable material.

The disclosure of the above identified application Ser. No. 762,789, U.S. Pat. No. 4,015,964 and U.S. Pat. No. 3,885,940 may be referred to for further information in connection with the general arrangements providing for accommodation of multiple fiberizing centers and also for numerous other features, such, for example, as fiber collection means, glass feed systems and blast and jet generating and delivery systems, and including also information concerning the parameters involved in establishing a zone of interaction of a jet and blast.

In connection with various dimensional relationships involved in the equipment of the present invention, particular attention is directed to FIG. 3 on which certain symbols have been applied to identify some of the dimensions. These are identified in the following table which also gives an average or typical value in milimeters, as well as a usable range for each such value.

| FEATURE | DIMENSION | SYMBOL | AVERAGE VALUE (mm) | VARIATION LIMITS (mm) |
|---|---|---|---|---|
| Bushing | Diameter of glass orifice | $d_T$ | 4 | 1 - 10 |
|  | Distance Between 2 holes |  | 10 | 5 |
| Jet | Inner diameter of jet tube | $d_t$ | 1 | 0.3 - 3 |
|  | Outer diameter of jet tube |  | 1.5 | 0.7 - 5 |
|  | Separation between 2 tubes |  | 10 | 5 |
| Blast | Vertical distance between the lips or thickness of the discharge section | $l_B$ | 25 | 10 - 50 |
|  | Width of the discharge section |  | 300 | 20 - 500 |

In addition to the foregoing dimensions, certain spacing relationships and also angular relationships should be observed, as indicated in the following table which gives an average or typical value in milimeters or degrees, as well as a usuable range for each such value.

| FEATURES | SYMBOL | AVERAGE VALUE (mm or degree) | VARIATION LIMITS (mm or degree) |
|---|---|---|---|
| Vertical distance of jet discharge orifice to the upper boundary of flow of the blast | $Z_{JB}$ | 45 | 30 - 60 |
| Vertical distance from the discharge opening of the glass stream to the jet discharge orifice | $Z_{JF}$ | 85 | 0 - 150 |
| Horizontal distance from the axis of the glass stream of the jet discharge orifice | $X_{JF}$ | 5 | 1 - 15 |
| Horizontal distance from the axis of the glass stream to the lip of the blast nozzle | $X_{BF}$ | 5 | 0 - 30 |
| Angle of Jet tube to the axis of glass stream | $\alpha jf$ | 10° | 3° - 45° |
| Angle of Jet tube to the direction of | $\alpha JB$ | 80° | 87° - 45° |

| FEATURES | SYMBOL | AVERAGE VALUE (mm or degree) | VARIATION LIMITS (mm or degree) |
|---|---|---|---|
| flow of the blast | | | |

With further reference to parameters of operation when employing the technique of the present invention, it is first pointed out that it is of course important that the glass be discharged from the glass orifice in a continuous stable stream. For this purpose, the rate of glass flow, the temperature of the bushing and the diameter of the glass discharge orifice should preferably be above certain predetermined limits. Thus, the pull rate of glass should be greater than 60 kg/hole for each 24 hour period; the bushing temperature should be greater than 1250° C, and the diameter of the glass discharge orifice should be greater than 2.5 milimeters. With at least certain types of glass formulations, observing these limits may assist in avoiding pulsations which have a tendency to accentuate until distinct droplets are formed. This phenomenon is incompatible with proper fiberization. In a typical or average working condition, the following values are appropriate; 100 kg/hole per day, bushing temperature 1400° C, glass orifice diameter 3 milimeters.

Additional operating ranges are as follows:

| Velocity | jet | 200 m/sec – 900 m/sec |
|---|---|---|
| | blast | 200 m/sec – 800 m/sec |
| Pressure | jet | .5 to 50 bars |
| | blast | .05 to .5 bars |
| Temperature | jet | 20° to 1800° C |
| | blast | 1300° to 1800° C |
| Kinetic Energy Ratio - jet to blast | | 10/1 – 1000/1 |

A typical operation according to the present invention may be carried out as given in the Example below.

Example

| Glass formulation: | |
|---|---|
| $SiO_2$ | 46.92 |
| $Fe_2O_3$ | 1.62 |
| $Al_2O_3$ | 9.20 |
| MnO | 0.16 |
| CaO | 30.75 |
| MgO | 3.95 |
| $Na_2O$ | 3.90 |
| $K_2O$ | 3.50 |

All parts by weight.

| Physical Properties | | | | |
|---|---|---|---|---|
| Viscosity | 30 | poises | at | 1310° C |
| | 100 | poises | at | 1216° C |
| | 300 | poises | at | 1155° C |
| Glass | orifice | | 3 mm | |
| | flow | | 100 kg/day per orifice | |
| Blast | temperature | | 1550° C | |
| | pressure | | .25 bar | |
| | velocity | | 530 m/s | |
| Jet | temperature | | 20° C | |
| | pressure | | 6 bar | |
| | velocity | | 330 m/s | |
| | orifice diameter | | 1 mm | |
| Ratio of Kinetic energies | | $\frac{Jet}{Blast} = \frac{24}{1}$ | | |
| Fiber diameter | | | | 6 microns |

In connection with the tabulations just above, particular attention is called to the figures given for the temperature and velocity of the jet and blast. Here it will be seen that the velocity of the jet is even lower than the velocity of the blast, which is in marked contrast to the examples given in our prior patent above referred to, but it will further be noted that the temperature of the jet is also very much lower than the temperature of the blast. Thus, notwithstanding the employment of a jet of lower velocity than that of the blast as is noted in the preceeding tabulation, the ratio of kinetic energies of the jet to the blast is of the order of 24 to 1. This relatively high kinetic energy ratio per unit of volume of the jet and blast results in penetration of the jet into the blast, as is desired, in order to develop the toration zone or zone of interaction of the jet and blast.

The foregoing represents an example of the toration technique according to FIG. 2 of the drawings, i.e., a technique in which the stream of attenuable material (in this case the glass) is subjected to a two-stage attenuation operation, because the glass is introduced into the influence of the jet before the jet reaches the blast, thereby providing a preliminary stage of attenuation under the influence of the jet, and a second stage of attenuation in consequence of introduction of the partially attenuated stream of glass into the zone of interaction of the jet with the blast.

In connection with the above it is pointed out that a jet of adequate velocity is readily obtained when using a source of compressed air as the source of the jet fluid. This is in distinct contrast to the employment of relatively high jet temperatures, with which it is technically more difficult to obtain high velocity, and because of the lower density of the fluid at high temperature it is therefore much more difficult to attain sufficient velocity to achieve the kinetic energy ratio required to effect penetration of the jet into the blast.

As above noted, it is convenient to employ jet temperatures near ambient or room temperature, but it will be understood that the jet temperature need not necessarily be as low as ambient or room temperature. Preferably the jet temperature is well below the softening point of the thermoplastic material being attenuated, and in the case of attenuation of glass or similar mineral materials, the jet temperature is preferably selected at a value below 200° C, and most desirably below 100° C, and this is true whether the jet is employed in a toration operation in which the stream of glass is subjected to two stages of attenuation, or in various other toration techniques in which only a single stage of attenuation is employed by introducing the stream of glass directly into the zone of interaction of the jet with the blast, as is disclosed in prior U.S. Pat. Nos. 4,015,964 and 3,885,940 above identified.

With respect to the temperatures and velocities of the jet and blast which are contemplated according to the present invention, it is pointed out that in the toration of thermoplastic materials such as glass, it is desirable to employ a blast temperature at least as high as a temperature approximating the lower end of the softening range of the thermoplastic material to be attenuated. Maintenance of such a temperature is desirable because substantial attenuation is desired within the blast. Thus, with most glass formulations and with similar types of thermoplastic mineral materials (either naturally occurring or synthetic), the lower end of the softening range is between about 600° and 900° C. With most of such materials it is preferred to employ a blast having a temperature of at least 1000° C. Although the blast temperature may be higher that just indicated, it is desirable to avoid excessive temperature because, if the temperature is too far above the softening range, the attenuation will be adversely affected, with resultant fragmentation of the fibers, or formation of slugs or shot.

Blast temperatures of the order of magnitude just referred to are advantageously achieved by employment of a gaseous fuel burner, and the utilization of the gaseous products of combustion as the blast.

In contrast with the foregoing, it is advantageous for various reasons already noted above to employ a jet of much lower temperature. The jet therefore need not be produced by the combustion of fuel, with resultant unnecessary fuel and energy consumption, but in contrast a common source of compressed air may be utilized for the supply of the jet gas, thereby providing a jet at a temperature near ambient or room temperature. Some variation from ambient temperature may be employed, as may result for example from action of a compressor, or by exposure of a storage tank to other equipment or atmospheric conditions tending to either raise or lower the temperature somewhat with respect to ambient. For most purposes, a jet temperature below about 100° C is useable and would be available from various forms of compressed air systems in common use.

With the temperature relationship of the jet and blast above referred to, it is contemplated that the velocities of the jet and blast be such that the kinetic energy of the jet per unit of volume should be higher than that of the blast, so that the jet will penetrate the blast and thereby provide the desired toration zone or zone of interaction. With a gaseous jet at a temperature near ambient or room temperature, the density of the air or gas of the jet is much higher than would be the case with products of customary combustion of fuel with air at temperatures of the order of those contemplated for use for the blast. In view of this, the desired kinetic energy of the jet may be obtained while still utilizing a jet velocity even well below the velocity of the blast. Indeed, in a typical case with blast velocities of the order of 200 to 800 m/sec, which is a suitable range as already indicated hereinabove, the jet velocity may even be lower than the blast velocity. This in turn makes possible a further economy in that it is not necessary (in order to provide the desired kinetic energy ratio and thus achieve penetration of the jet into the blast), to impart high velocity to the jet.

With a blast comprising products of combustion at a temperature above about 1000° C and a velocity in the range from about 250 to 800 m/sec, and with a jet comprising air (or a gas of similar density) at a temperature below about 100° C, the desired predominance of kinetic energy of the jet over the blast can be attained by employment of a jet velocity less than about that of the blast, for instance in the range of from about 200 to about 400 m/sec.

It is also mentioned that when attenuating certain materials having relatively high melting temperatures or with which it is desired to use high temperatures for purpose of feeding the material, the initial delivery of the material into the influence of a jet of relatively low temperature is desirable in order to bring the temperature of the stream of attenuable material down to the optimum temperature for the attenuation to be effected in the blast.

We claim:

1. A process for forming fibers from attenuable thermoplastic mineral material, characterized by generating a gaseous jet, generating a gaseous blast in a path intercepting the jet, the cross sectional dimension of the jet being smaller than that of the blast in a direction transverse to the blast, and the jet being of temperature and velocity below that of the blast, but having density and thus kinetic energy per unit of volume higher than that of the blast thereby providing for penetration of the jet into the blast to thereby produce a zone of interaction of the jet and blast, and delivering a stream of attenuable material into said zone of interaction.

2. A process for forming fibers from thermoplastic attenuable material having a softening range above 600° C, characterized by generating a gaseous jet, generating a gaseous blast in a path intercepting the jet, the cross sectional dimension of the jet being smaller than that of the blast in a direction transverse to the blast, the jet being of temperature lower than 200° C and the blast having a temperature above 1000° C, and the velocities of the jet and blast providing a jet of higher kinetic energy per unit of volume than the blast thereby providing for penetration of the jet into the blast to thereby provide a zone of interaction of the jet and blast, and delivering a stream of the attenuable material into said zone of interaction.

3. A process for forming fibers from attenuable material, comprising generating a gaseous blast, generating a gaseous jet in a region spaced from the boundary of the blast and directed toward the blast so that the jet core induces ambient gases before the jet reaches the blast, the combined flow of the jet core and the induced gases having a velocity lower than that of the blast but having a temperature and thus a density providing kinetic energy per unit of volume sufficiently high to penetrate the blast and provide a zone of interaction in the blast, and delivering a stream of attenuable material into the influence of the gases induced by the jet so that the stream of attenuable material is carried by the jet into said zone of interaction.

4. A process for forming fibers from attenuable material, characterized by generating a gaseous jet, generating a gaseous blast in a path intercepting the jet, the cross sectional dimension of the jet being smaller than that of the blast in a direction transverse to the blast and the jet being of velocity in the range of from substantially lower than that of the blast to not substantially higher than that of the blast but also being of temperature sufficiently below that of the blast to provide a density and thus a kinetic energy per unit of volume higher than that of the blast and thereby provide for penetration of the jet into the blast to produce a zone of interaction of the jet and blast, and delivering a stream of attenuable material into said zone of interaction.

5. A process as defined in claim 4 in which the attenuable material delivered to the zone of interaction is a thermoplastic mineral material and in which the temperature of the blast is at least 1000° C.

6. A process as defined in claim 5 in which the temperature of the jet approximates room temperature.

7. A process for forming fibers from thermoplastic attenuable material having a softening range above 600°

C, characterized by generating a gaseous jet, generating a gaseous blast in a path intercepting the jet, the jet being of temperature lower than 200° C and the blast having a temperature above 1000° C and the jet having a higher kinetic energy per unit of volume than the blast thereby providing for penetration of the jet into the blast to thereby provide a zone of interaction of the jet and blast, and delivering a stream of the attenuable material into said zone of interaction.

* * * * *